(12) United States Patent
Johansson

(10) Patent No.: US 6,315,374 B1
(45) Date of Patent: Nov. 13, 2001

(54) TRACK TENSIONING DEVICE FOR TRACKED AUTOMOTIVE VEHICLES

(75) Inventor: Hans Johansson, Kopmanholmen (SE)

(73) Assignee: Hagglunds Vehicle AB, Ornskoldsvik (SE)

( * ) Notice: Subject to any disclaimer, the term of this patent is extended or adjusted under 35 U.S.C. 154(b) by 0 days.

(21) Appl. No.: 09/509,877
(22) PCT Filed: Sep. 25, 1998
(86) PCT No.: PCT/SE98/01722
§ 371 Date: Apr. 3, 2000
§ 102(e) Date: Apr. 3, 2000
(87) PCT Pub. No.: WO99/17978
PCT Pub. Date: Apr. 15, 1999

(30) Foreign Application Priority Data

Oct. 3, 1997 (DE) .................................................. 9703612

(51) Int. Cl.[7] .................................................. B62D 55/14
(52) U.S. Cl. .......................... 305/145; 305/144; 305/153; 305/125
(58) Field of Search ..................................... 305/143, 144, 305/145, 146, 147, 149, 150, 151, 152, 153, 154, 125, 124; 180/9.5, 9.54; 474/101, 138, 135

(56) References Cited

U.S. PATENT DOCUMENTS

| | | | |
|---|---|---|---|
| 1,401,625 | * 12/1921 | Mader | 305/143 |
| 2,843,431 | * 7/1958 | Beaufort | 305/145 |
| 3,784,263 | * 1/1974 | Hendrickson et al. | 305/154 |
| 4,826,260 | * 5/1989 | Plourde | 305/145 |
| 5,988,775 | * 11/1999 | Nordberg | 305/143 |
| 6,027,185 | * 2/2000 | Crabb | 305/148 |

FOREIGN PATENT DOCUMENTS

| | | | |
|---|---|---|---|
| 203517 | * 5/1956 | (AU) | 305/145 |
| 0 597 350 | 5/1994 | (EP) . | |
| 504 474 | 2/1997 | (SE) . | |

* cited by examiner

Primary Examiner—S. Joseph Morano
Assistant Examiner—Long Bao Nguyen
(74) Attorney, Agent, or Firm—Young & Thompson

(57) ABSTRACT

The invention relates to a sprung track tensioning device (10) for tracked vehicles, intended to be mounted at the rear on a support (16) of a track set of the vehicle. The device comprises an elongate pendulum arm (12), one end portion (14) of which is designed to be fastened pivotably to the support (16) via a first torsion spring (18). The pendulum arm (12) bears a second torsion spring (36) which can be connected to the support (16) via a link arm system (38).

10 Claims, 2 Drawing Sheets

TRACK TENSIONING DEVICE FOR TRACKED AUTOMOTIVE VEHICLES

The present invention relates to a sprung track tensioning device for tracked automotive vehicles, which comprises a tension wheel arrangement intended to be mounted at the rear on a support of a track set of the vehicle for supporting track wheel units, which tension wheel arrangement comprises an elongate pendulum arm which has a first end portion arranged so as to support a pivotable rocker arm, in which a tension wheel unit is rotatably mounted, and a second end portion for pivotable fastening of the pendulum arm to the support.

SE-C2-504 474 describes a sprung track tensioning device of the abovementioned type, in which the tension wheel unit is mounted on an elongate horizontal pendulum arm, so that, on a spring deflection movement, the tension wheel unit describes a very small movement in the horizontal direction and does not then appreciably influence the geometrical track length and thus the track tension. The track tensioning device also has a short prestressing or torsion arm which, by means of a torsion spring, has a prestressing effect on the rear, free end of the pendulum arm via a force-transmitting rubber element. The torsion arm has a horizontally projected length which essentially corresponds to the horizontally projected length of the pendulum arms of the bearing wheel units, so that essentially the same springing characteristic is obtained for the bearing wheels and the tension wheels when essentially similar torsion springs are used for the respective pendulum arms. In this construction, the pendulum arm for the tension wheel unit must be fastened pivotably to the support (ski beam) a little way in from the rear end of the latter, and the force-transmitting rubber element must be capable of absorbing shearing movements on spring deflection of the tension wheel unit, as the pendulum arms and the torsion arm describe different pivoting paths on spring deflection movements.

An object of the present invention is to propose a compact track tensioning device that can be mounted on the rear end of the ski beam and afford essentially the same good springing and running characteristics as the abovementioned known track tensioning device but with a shorter construction length.

According to the invention, this is achieved by virtue of the features indicated in the characterizing part of Patent claim 1. In this arrangement, the elongate pendulum arm is thus fastened to the rear end of the ski beam via a primary torsion spring. As, for practical reasons, this torsion spring alone cannot achieve the desired springing characteristics of the pendulum arm (it would in that case be undesirably large), a secondary spring member (auxiliary torsion spring) is coordinated with the pendulum arm via a link arm system.

Further features of the device according to the invention are indicated in the dependent claims.

The invention is described in greater detail below with reference to the appended drawings, in which.

Figures 1, 2:
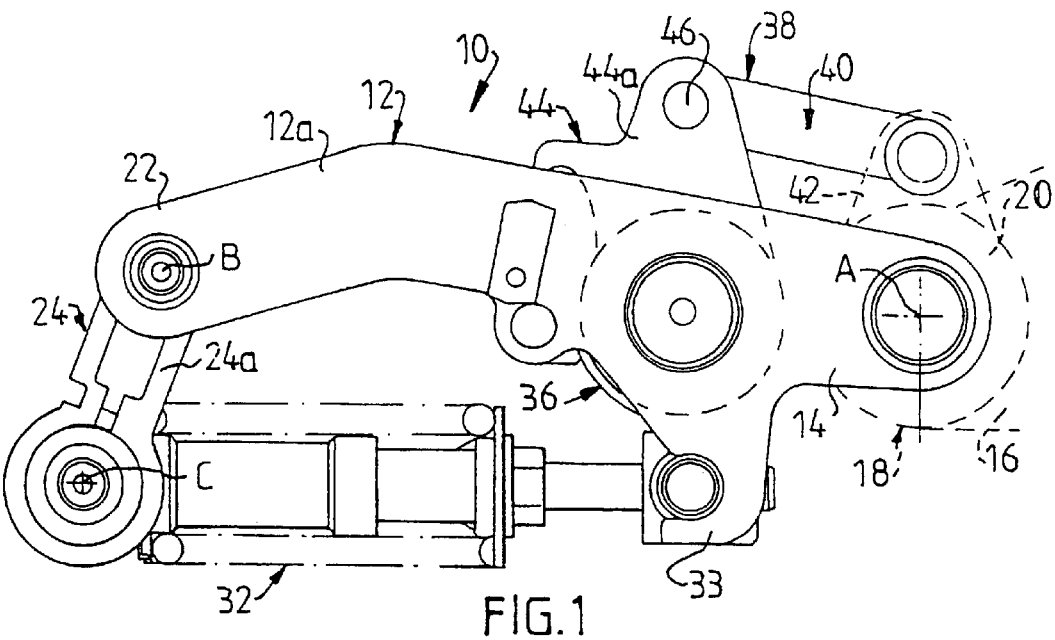
FIG. 1 is a side view of a sprung track tensioning device according to the invention.
FIG. 2 is a plan view of the track tensioning device in FIG. 1.

In FIG. 1, an embodiment of a sprung track tensioning device according to the present invention is designated generally by 10. The track tensioning device 10 comprises an elongate pendulum arm 12 which consists of two separate parallel arm side parts 12a, 12b (FIG. 2) which are rigidly interconnected. The front end portion 14 of the pendulum arm 12 is designed to be interconnected pivotably with a support 16, referred to below as the ski beam, of a track set of a tracked automotive vehicle, for example a front caterpillar unit of an articulated caterpillar vehicle, via a primary torsion spring 18. The torsion spring 18 comprises in a manner known per se an outer, cylindrical metal sleeve 20 which surrounds concentrically an inner metal sleeve (not shown) with, located between the sleeves, a rubber body which is vulcanized firmly in the two metal sleeves. The outer sleeve 20 is fixed to the rear end of the ski beam 16 and forms a stator part of the torsion spring 18 while the end portion 14 of the two side parts 12a, 12b of the pendulum arm 12 is connected to the inner sleeve of the torsion spring 18, which constitutes a rotor part. The pendulum arm 12 can thus perform a limited pivoting movement about a centre axis A against the action of the force in the torsion spring 18.

Suspended pivotably in the rear end portion 22 of the pendulum arm 12 is a tension wheel holder 24 which comprises two downwardly directed rocker arms 24a, 24b which, at the top, are pivotable about a centre axis B and, at the bottom, support a transverse tubular axis 26 for the rotatable mounting of a tension wheel unit 28 in the form of two axially separate tension wheels (FIGS. 3 and 4) for maintaining an appropriate track tension in a driving track 30 of a tracked vehicle (not shown).

In order to make possible appropriate setting of an initial, static track tension in the driving track 30, that is to say in order for it to be possible to vary the distance between the centre A of pivoting of the pendulum arm 12 and the centre C of rotation of the tension wheels 28, the track tensioning device comprises an adjusting device 32, the length of which is variable and which on the one hand engages in an articulated manner with downwardly directed projections 33 on the arm side parts 12a, 12b and on the other hand is articulated about the axis C which connects the centres of the tension wheels 28. The adjusting device 32 may also have a built-in springing and damping function so as to allow rapid tightening of the driving track 30 in order to compensate slack in the same in the event of, for example, spring deflection of bearing wheel units of the track set on heavy braking of the vehicle, as a result of which the risk of track lurch is minimized.

In order to give the relatively long pendulum arm 12 essentially the same springing characteristics as the bearing wheel units 34 with short pendulum arms 35 (FIGS. 3 and 4) of the track sets of the vehicle, it is proposed according to the present invention that an auxiliary torsion spring 36 acts on the pendulum arm 12 as otherwise the dimensions of the torsion spring 18 would have to be so great that it would be impractical and unwieldy. For this purpose, a secondary torsion spring 36 of, for example, the same type as the torsion spring 18 is fastened at a point between the centre A of pivoting of the pendulum arm 12 in the ski beam 16 and the centre B of pivoting of the rocker arms 24a, 24b. The outer metal sleeve of the secondary torsion spring 36 is connected via a link arm system 38 to the rear end portion of the ski beam 16 while the inner metal sleeve of the torsion spring 36 is connected in a rotationally fixed manner to the two arm side parts 12a, 12b of the pendulum arm 12. The link arm system 38 comprises on the one hand a first link arm 40 which is connected pivotably to the ski beam 16 via a pair of brackets 42 which can be rigidly mounted on the stationary outer sleeve part 20 of the torsion spring 18 and on the other hand a second link arm 44 in the form of a pair of separate parallel bracket arms 44a, 44b which are rigidly fixed to the outer sleeve of the secondary torsion spring 36. The first and second link arms 40, 44 are interconnected in an articulated manner via a bearing pin 46.

Figure 3:
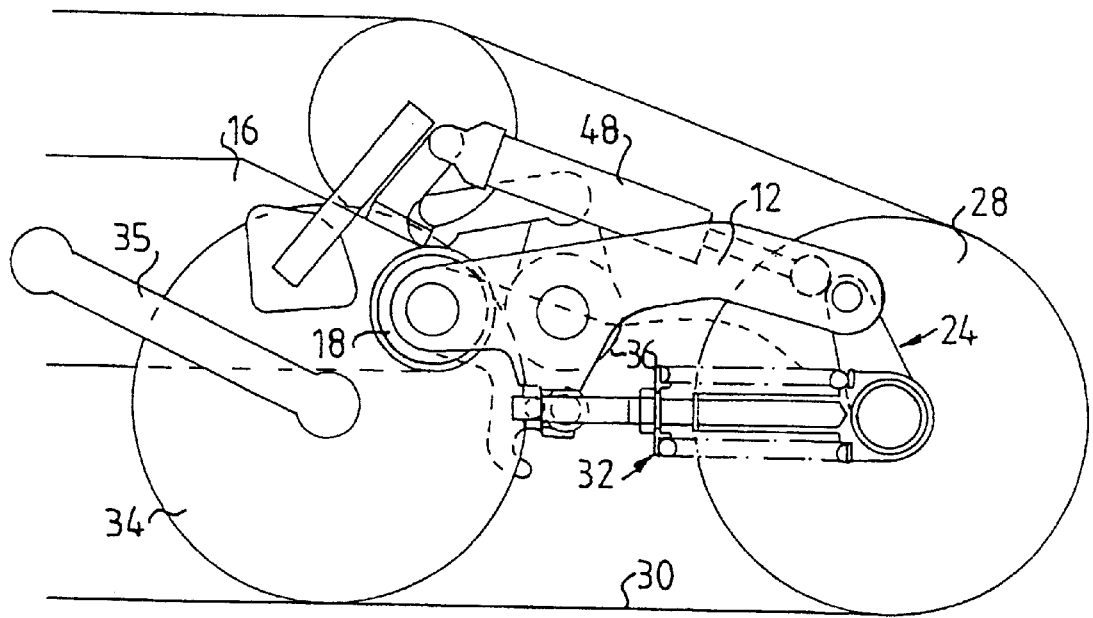
FIG. 3 shows diagrammatically in a side view a static use position of the sprung track tensioning device according to the invention.
Figure 4:
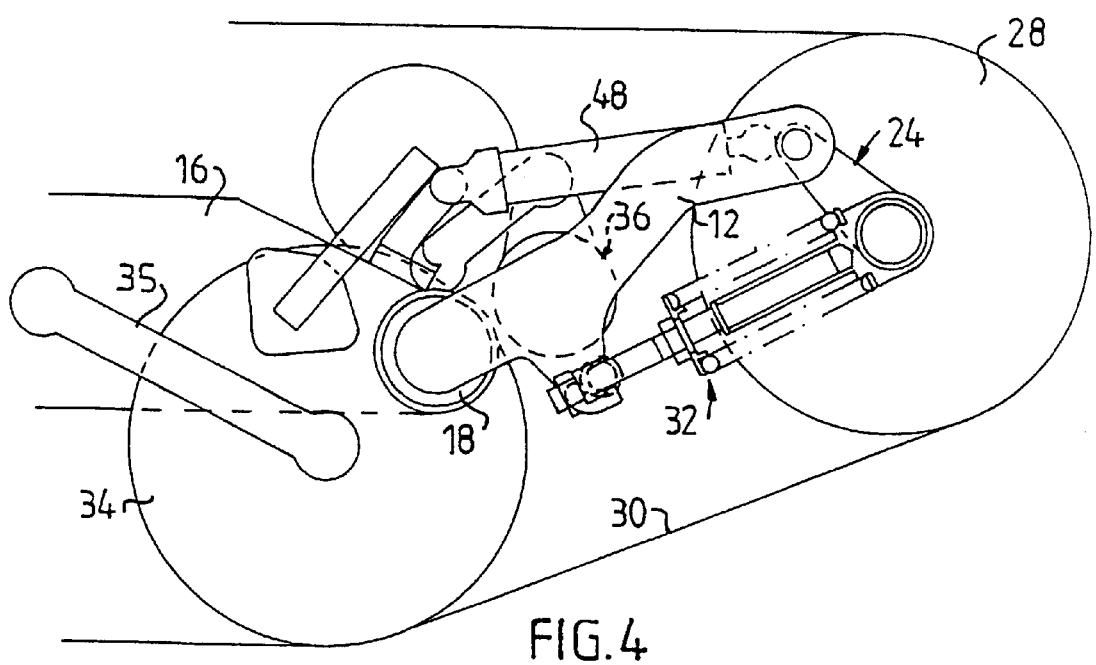
FIG. 4 shows the track tensioning device in FIG. 3 in an upwardly pivoted state.

As shown diagrammatically in FIGS. 3 and 4, an impact absorber 48 may be connected between the ski beam 16 and the outer end portion of the pendulum arm 12 so as to damp the pivoting movements of the latter.

The track tensioning devices according to the invention function in the manner described below.

FIG. 3 shows diagrammatically a static operating position of the track tensioning device 10, in which the tension wheel unit 28 and also the bearing wheel units 34 hold the driving track 30 in contact with the ground. In this position, the pendulum arm 12 for the tension wheel unit 28 lies essentially horizontally. The requisite basic tension in the driving track 30 is set with the aid of the adjusting device 32.

FIG. 4 shows a maximum upwardly pivoted position of the tension wheel unit 28, for example in the event of driving over an object on the ground, the pendulum arm 12 being pivoted up against the action of the force in the two torsion springs 18, 36 which are arranged so as to interact in such a manner that the springing characteristics of the pendulum arm 12 correspond essentially to those of the respective bearing wheel units. This construction thus has a primary torsion spring 18 connected at the articulated fastening point A of the pendulum arm 12 in the rear end of the ski beam 16, and, located a little way along the pendulum arm 12, a secondary, auxiliary torsion spring 36 which, via the link arm system 38, adds its torsional force acting on the pendulum arm 12 to the torsional force of the primary torsion spring.

On account of the relatively great length and essentially horizontal position of the pendulum arm 12, the tension wheels 28 describe a very small movement in the horizontal direction on spring deflection movements, as a result of which the geometrical track length and thus the track tension are influenced minimally, which reduces the risk of track lurch etc. Any track slack caused by heavy braking of the vehicle by way of spring deflection of a number of bearing wheel units can be compensated by automatic expansion of the adjusting device 32 which pivots the tension wheel unit 28 and the rocker arm 24a, 24b about the axis B and in this way tends to maintain constant track tension in the driving track 30.

The geometry of the track tensioning device is furthermore such that the force resultant acting on the tension wheels 28, which derives from the traction force components acting on the driving track via the tension wheels 28, extends through the pivoting axis a of the pendulum arm 12 in the ski beam 16 irrespective of the current position of the tension wheels 28 between upper and lower end positions.

What is claimed is:

1. Sprung track tensioning device for tracked automotive vehicles, comprising a tension wheel arrangement (10) intended to be mounted at the rear on a support (16) of a track set of the vehicle for supporting track wheel units (34, 28), which tension wheel arrangement (10) comprises an elongate pendulum arm (12) which has a first end portion (22) arranged so as to support a pivotable rocker arm (24a, 24b), in which a tension wheel unit (28) is rotatably mounted, and a second end portion (14) for pivotable fastening of the pendulum arm (12) to the support (16), characterized in that said second end portion (14) of the pendulum arm (12) is designed to be fastened pivotably to the support (16) via a first torsion spring (18), in that the pendulum arm (12) can, at a connection point between its centre (A) of pivoting in the support (16) and the centre (B) of pivoting of the rocker arm (24a, 24b), be connected to the support (16) via a link arm system (38), and in that a spring member (36) coordinated with the link arm system (38) is arranged so as to act on the pendulum arm (12) in the same pivoting direction as the first torsion spring (18).

2. Track tensioning device according to claim 1, characterized in that the link arm system (38) comprises a first link arm (40) which is connected pivotably to the support (16) and is connected in an articulated manner to a second link arm (44) connected in an articulated manner to the connection point in the pendulum arm (12).

3. Track tensioning device according to claim 1 or 2, characterized in that the spring member (36) consists of a second torsion spring.

4. Track tensioning device according to claim 3, characterized in that the second link arm (44) is connected to the pendulum arm (12) via the second torsion spring (36).

5. Track tensioning device according to claim 4, characterized in that the second link arm (44) is connected to a stator part of the second torsion spring (36).

6. Track tensioning device according to claim 4 or 5, characterized in that the first and second torsion springs (18, 36) are of the type that comprises an inner cylindrical metal sleeve, an outer metal sleeve (20) concentrically surrounding the latter, and a rubber body located between the sleeves, which is vulcanized firmly in the inner and outer metal sleeves.

7. Track tensioning device according to claim 6, characterized in that the second link arm (44) is connected to the outer metal sleeve (20) while the pendulum arm (12) is connected to the inner metal sleeve.

8. Track tensioning device according to any one of claims 1–7, characterized in that an impact absorber (48) is connected between the support (16) and an outer part of the pendulum arm (12).

9. Track tensioning device according to any one of claims 1–8, characterized in that the pendulum arm (12) consists of two separate, essentially parallel, interconnected arm side parts (12a, 12b).

10. Track tensioning device according to any one of claims 1–9, characterized by a device (32) for making it possible to change the distance between the centre (C) of rotation of the tension wheel unit (28) in the rocker arm (24a, 24b) and the centre (A) of pivoting of the pendulum arm in the support (16), which device (32) comprises two parts which are displaceable relative to one another, one part being fastened in an articulated manner on an end portion of the rocker arm (24a, 24b) located on the tension wheel unit (28) while the other part is fastened in an articulated manner to the pendulum arm (12).

* * * * *